US008809605B2

(12) United States Patent
Bao et al.

(10) Patent No.: US 8,809,605 B2
(45) Date of Patent: Aug. 19, 2014

(54) CARBOHYDRATES UPGRADING AND HYDROTREATING TO HYDROCARBONS

(75) Inventors: Yun Bao, Bartlesville, OK (US); Edward L. Sughrue, II, Bartlesville, OK (US); Jianhua Yao, Bartlesville, OK (US); TiePan Shi, Bartlesville, OK (US); Kristi A. Fjare, Bartlesville, OK (US); Lisa L. Myers, Bartlesville, OK (US); Ronald E. Brown, Collinsville, OK (US)

(73) Assignee: Phillips 66 Company, Houston, TX (US)

( * ) Notice: Subject to any disclaimer, the term of this patent is extended or adjusted under 35 U.S.C. 154(b) by 498 days.

(21) Appl. No.: 13/089,458

(22) Filed: Apr. 19, 2011

(65) Prior Publication Data
US 2011/0263916 A1 Oct. 27, 2011

Related U.S. Application Data

(60) Provisional application No. 61/328,450, filed on Apr. 27, 2010.

(51) Int. Cl.
| | |
|---|---|
| *C07C 1/20* | (2006.01) |
| *C10G 45/30* | (2006.01) |
| *C01B 3/38* | (2006.01) |
| *C10G 3/00* | (2006.01) |
| *C10G 45/02* | (2006.01) |
| *C10G 45/46* | (2006.01) |
| *C10G 45/44* | (2006.01) |

(52) U.S. Cl.
CPC .............. *C10G 3/50* (2013.01); *C10G 2300/42* (2013.01); *C10G 45/30* (2013.01); *C01B 2203/1058* (2013.01); *C10G 2300/1014* (2013.01); *C01B 2203/062* (2013.01); *C10G 2400/02* (2013.01); *C01B 3/38* (2013.01); *C01B 2203/0233* (2013.01); *C10G 3/49* (2013.01); *C01B 2203/0283* (2013.01); *C10G 45/02* (2013.01); *C01B 2203/107* (2013.01); *C10G 2300/4081* (2013.01); *C10G 45/46* (2013.01); *C01B 2203/1082* (2013.01); *C10G 2300/202* (2013.01); *C10G 45/44* (2013.01); *C01B 2203/1241* (2013.01); *C01B 2203/1247* (2013.01)
USPC ........... 585/240; 585/242; 585/357; 585/469; 585/638; 585/733; 44/307; 44/605; 44/606

(58) Field of Classification Search
USPC ................ 585/240, 242, 357, 469, 638, 733; 44/307, 605, 606
See application file for complete search history.

(56) References Cited

U.S. PATENT DOCUMENTS

| 4,097,367 A | 6/1978 | Haag et al. | |
|---|---|---|---|
| 4,413,153 A * | 11/1983 | Garwood et al. | ............. 585/304 |

(Continued)

FOREIGN PATENT DOCUMENTS

| EP | 0366138 | 2/1990 |
|---|---|---|
| WO | 2011078909 | 6/2011 |

OTHER PUBLICATIONS

PCT/US2011/033049 PCT International Search Report (PCT/ISA/210) Dated Feb. 27, 2012.

(Continued)

*Primary Examiner* — Brian McCaig
(74) *Attorney, Agent, or Firm* — Phillips 66 Company (57) ABSTRACT

Technologies to convert biomass to liquid hydrocarbon fuels are currently being developed to decrease our carbon footprint and increase use of renewable fuels. Since sugars/sugar derivatives from biomass have high oxygen content and low hydrogen content, coke becomes an issue during zeolite upgrading to liquid hydrocarbon fuels. A process was designed to reduce the coke by co-feeding sugars/sugar derivatives with a saturated recycle stream containing hydrogenated products.

34 Claims, 1 Drawing Sheet

(56) References Cited

U.S. PATENT DOCUMENTS

| | | |
|---|---|---|
| 4,503,278 A | 3/1985 | Chen et al. |
| 4,690,903 A | 9/1987 | Chen et al. |
| 4,950,812 A * | 8/1990 | Jacobs et al. ............ 568/863 |
| 5,336,819 A | 8/1994 | McAuliffe et al. |
| 5,841,678 A | 11/1998 | Hasenberg et al. |
| 6,090,990 A | 7/2000 | Yao et al. |
| 7,550,634 B2 | 6/2009 | Yao et al. |
| 7,678,950 B2 | 3/2010 | Yao et al. |
| 2009/0282865 A1 * | 11/2009 | Martinez et al. ............ 62/620 |
| 2010/0099933 A1 | 4/2010 | Yao et al. |
| 2011/0046423 A1 | 2/2011 | Sughrue et al. |

OTHER PUBLICATIONS

U.S. Appl. No. 12/912,164, Yao et al.

* cited by examiner

CARBOHYDRATES UPGRADING AND HYDROTREATING TO HYDROCARBONS

CROSS REFERENCE TO RELATED APPLICATIONS

This application is a non-provisional application which claims benefit under 35 USC §119(e) to U.S. Provisional Application Ser. No. 61/328,450 filed Apr. 27, 2010, entitled "CARBOHYDRATES UPGRADING AND HYDROTREATING TO HYDROCARBONS," which is incorporated herein in its entirety.

STATEMENT OF FEDERALLY SPONSORED RESEARCH

None.

FIELD OF THE DISCLOSURE

The present invention relates generally to the conversion of carbohydrates to fuel range hydrocarbons.

BACKGROUND OF THE DISCLOSURE

There is a national interest in the discovery of alternative sources of fuels and chemicals that are not derived from petroleum resources. As the public discussion concerning the availability of petroleum resources and the need for alternative sources continues to grow, it is anticipated that future government mandates will require transportation fuels to include, at least in part, hydrocarbons derived from sources besides petroleum. As such, there is a need to develop alternative sources for hydrocarbons useful for producing fuels and chemicals.

One possible alternative source of hydrocarbons for producing fuels and chemicals is the natural carbon found in plants and animals, such as for example, in the form of carbohydrates. These so-called "natural" carbon resources (or renewable hydrocarbons) are widely available, and remain a target alternative source for the production of hydrocarbons. For example, it is known that carbohydrates and other sugar-based feedstocks can be used to produce ethanol, which has been used in gasohol and other energy applications. However, the use of ethanol in transportation fuels has not proven to be cost effective and may not be achievable on a scale significant to current fuel requirements.

Carbohydrates, however, can also be used to produce fuel range hydrocarbons. Although some upgrading technology has been developed to turn biologically derived materials into useful fuel and chemical feedstocks. Unfortunately, many carbohydrates (e.g., starches) are undesirable as feedstocks due to the costs associated with converting them to a usable form. In addition, many carbohydrates are known to be "difficult" to convert due to their chemical structure, the hydrocarbon product produced is undesirable, or the conversion process results in relatively low yields of desirable products. Among the compounds that are difficult to convert include compounds with low effective hydrogen to carbon ratios like oxygenates, including carbohydrates such as starches, sugars, carboxylic acids and anhydrides, lower glycols, glycerin and other polyols, ethers, esters and short chain aldehydes.

Chen, et al. U.S. Pat. No. 4,503,278, teaches a process for the conversion of carbohydrates such as starch, cellulose and sugar into hydrocarbon products of increased carbon content. Chen, et al. U.S. Pat. No. 4,690,903, uses an ethanol fermentation process in which an aqueous solution of fermentable sugar is converted by an ethanol-producing microorganism such as a yeast to a dilute aqueous solution of ethanol with the ethanol being present in the solution at a concentration which does not exceed a predetermined maximum level. McAuliffe, et al. U.S. Pat. No. 5,336,819, teaches the conversion of cellulose to hydrocarbon fuel, particularly fuel oil can be carried out using a polycyclic hydrogen donor substance. Jelks, EP0366138, teaches a process for manufacturing fuel from lingo-cellulose material.

Efforts to convert difficult carbohydrate materials to hydrocarbons have focused on methods for increasing the effective hydrogen to carbon ratio of the reactants, including converting oxygenates in the presence of hydrogen, steam, or other reactants, and by employing various catalysts. However, these processes are often complex and are costly, and the reaction products produced as a result of these processes are oftentimes undesirable, result in low weight percentages, or often result in an increase in undesirable byproducts such as the production of carbon monoxide, carbon dioxide and worse yet difficult to process coke byproducts.

As such, development of an improved process for converting carbohydrates, including "difficult" to convert starches as mentioned above, to hydrocarbon, would be a significant contribution to the arts. In addition, development of a process for converting carbohydrates to hydrocarbons which yields significant quantities of desirable hydrocarbon products such as aromatics and olefins would be a significant contribution to the art.

BRIEF DESCRIPTION OF THE DISCLOSURE

One object of the present invention is to provide a process for the conversion of carbohydrate and other biologically derived oxygenates to hydrocarbons in which the rate of coke formation and the production of $CO_X$ by-products during the conversion is minimized.

Cellulose and hemicellulose are two major constituents in the biomass and can be broken down to C6 and C5 sugars using an acid or enzyme hydrolysis process. C6 and C5 sugars can be further converted to sugar alcohols or other derivatives. The sugars and their derivatives can be upgraded to gasoline range hydrocarbons, mainly aromatics, using a ZSM-5 catalyst, hydrotreating or combinations of ZSM-5 and hydrotreating. However, the sugars and sugar derivatives with less effective hydrogen to carbon ratio are easily converted to coke and frequently lower liquid yield, foul expensive refining catalysts and other equipment. Addition of hydrogen donors with high effective hydrogen to carbon ratio such as methanol (U.S. Pat. No. 4,503,278) and i-pentane (U.S. Pat. No. 7,678,950) have been used to decrease coking, incorporated by reference. U.S. Pat. No. 6,090,990 describes an improved catalyst containing a mixture of zeolite and a binder treated with boron trichloride which when used in the conversion of hydrocarbons to ethylene, propylene and BTX (benzene, toluene, xylene and ethylbenzene) aromatics. U.S. Pat. No. 7,550,634 describes hydrotreating triglycerides to fuel range hydrocarbons. In US 2011-0046423, by Sughrue, et al., describe hydrotreating a mixture of sorbitol and diesel over a commercial hydrotreating catalyst to produce lighter alkanes and hexanes desirable for gasoline fuels. Additionally, in US 2010-0099933, Yao, et al., describe the process of converting carbohydrates to gasoline boiling range hydrocarbons by converting a carbohydrate-containing material to a hydrogenated carbohydrate material over a bi-functional catalyst and then converting the hydrogenated carbohydrate material to gasoline boiling range hydrocarbons over a zeolite catalyst.

In U.S. Ser. No. 12/912,164, Yao, et al., use a zinc-platinum or cobalt-molybdenum impregnated zeolite catalyst (ZnPt-zeolite or CoMo-zeolite) with a carbohydrate or polyol to produce polyols and hydrocarbons. These patents and applications referenced above are specifically incorporated by reference in their entirety.

Figure 1:
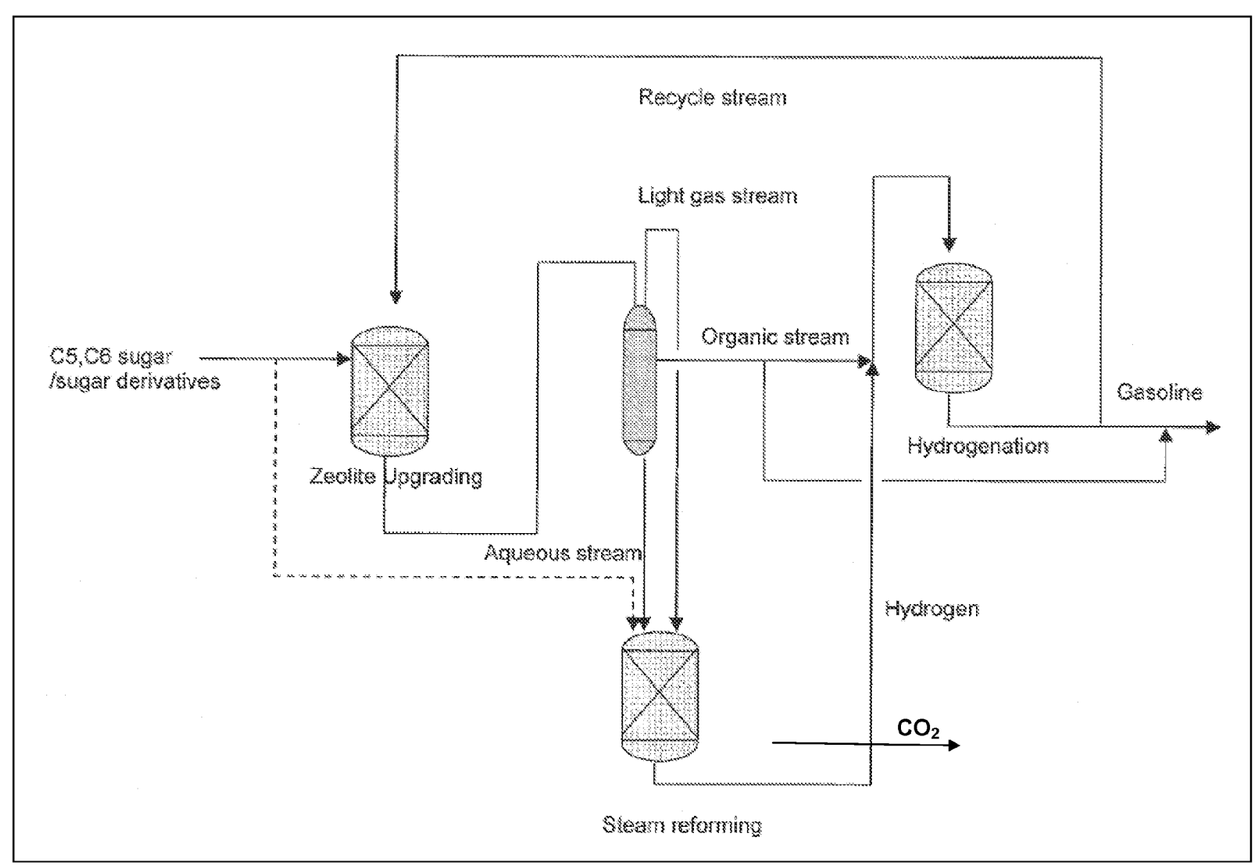
FIG. 1: Reaction process with feedstream containing C5/C6 carbohydrates and polyols is mixed with a recycle stream containing hydrogenated hydrocarbons on a zeolite upgrading catalyst. The upgraded hydrocarbons are then separated into a light gas stream, aqueous solution and organic stream. The light gas stream and aqueous solution are used in a steam reformer to generate hydrogen and heat while giving off $CO_2$. The organic stream is fed into the hydrogenation reactor with hydrogen at an elevated temperature to generate various gasoline products, all highly hydrogenated. Some of the hydrogenated hydrocarbons are fed as a recycle stream to the zeolite upgrading. These recycled, saturated hydrogen donors will increase the productivity and quality of the zeolite upgrading reaction.

In one embodiment of the current invention, a self-sustained process is proposed where sugars, sugar derivatives, polyols and other carbohydrates can be co-fed with a recycle stream from hydrotreated product as hydrogen donor for zeolite upgrading to produce renewable gasoline as shown in FIG. 1. Another advantage is that gasoline after hydrogenation process will be less aromatic compared with the product directly from zeolite upgrading. The following intermediate processes may be used to upgrade the carbohydrate starting material to a gasoline range fuel product:

1) Sugars or sugar derivatives can be co-fed with a recycle stream from hydrotreated product as a hydrogen donor for zeolite upgrading.
2) Products from zeolite upgrading go through the separator to be separated as aqueous stream, organic stream and light gas stream (such as $CH_4$, $C_2H_6$). The organic stream comprises gasoline range hydrocarbons, mainly aromatics.
3) Light gas stream or a portion of the sugar stream and/or any water-soluble partially converted products from the zeolite reforming process can be used to generate hydrogen by steam reforming.
4) Generated hydrogen can react with aromatics in the organic stream from step 2 to form saturated products. A stream of the hydrotreated products can be recycled back as hydrogen donor for zeolite upgrading.
5) The hydrotreated products can also be blended with the products from zeolite upgrading to form final gasoline products with the controlled aromatic content.

In one embodiment, an upgrading system is described to convert polyols including carbohydrates and carbohydrate derivatives into hydrocarbons by taking a oxygenate feedstock, using a zeolite catalyst to upgrade to mixed hydrocarbons with saturated and unsaturated hydrocarbons in a variety of sizes, separating the upgraded hydrocarbons into a light gas stream, an aqueous stream and an organic stream, reforming the light gas stream into a hydrogen stream, hydrotreating the organic stream or a portion of the hydrocarbon stream and hydrogen stream to create a saturated hydrocarbon stream, and a recycle system where a portion of the hydrotreater product containing saturated hydrocarbons is recycled to the catalytic upgrader as a hydrogen donor molecule.

The feedstock includes oxygenates derived from biological materials including carbohydrates, sugars, pentoses, hexoses, monosaccharaides, dextrose, glucose, α-D-glucopyranose, β-D-glucopyranose, α-D-glucofuranose, β-D-glucofuranose, fructose, galactose, disaccharides, sucrose, lactose, maltose, fructose, cellobiose, melibiose, raffinose, glyceraldehyde, erythritol, xylitol, sorbitol, arabinitol, isosorbide, glycerol, glycerin, alcohol, methanol (MeOH), ethanol (EtOH), isopropyl alcohol (IPA), butanol (BuOH), n-butanol, t-butanol, ethers, methyl tert-butyl ether (MTBE), tertiary amyl methyl ether (TAME), tertiary hexyl methyl ether (THEME), ethyl tertiary butyl ether (ETBE), tertiary amyl ethyl ether (TAEE), diisopropyl ether (DIPE), hydroxymethyl-tetrahydrofuran or tetrahydro-2-furfuryl alcohol (THFA), methyl-tetrahydrofuran, 2-methyltetrahydrofuran, 3-methyltetrahydrofuran, tetrahydrofuran, diols, methanediol ($H_2C(OH)_2$), ethylene glycol, propane diols, 1,2-propanediol, 1,3-propanediol, butanediols, 1,2-butanediol, 1,3-butanediol, 1,4-butanediol, 2,3-butanediol, pentane diols, 1,2-pentanediol, 1,5-pentanediol, 1,8-octanediol, etohexadiol, p-menthane-3,8-diol, 2-methyl-2,4-pentanediol, aldehydes, propanal, butanal, 2,5-furan-diacrboxyaldehyde, carboxylates, acetic acid, oxopropanoic acid, acrylic acid, levulinic acid, succinic acid, 2,5-furan-dicarboxylic acid, aspartic acid, glucaric acid, glutamic acid, itaconic acid, acetylacrylic acid, 4-O-Me-glucuronic acid, gluconic acid, xylonic acid, esters, levuninate esters, lactones, valero lactone, α-methylene-γ-valerolactone, angelilactones, trisaccharides, oligosaccharides, polysaccharides, starch, derivatives, dimers, trimers, polymers and the like.

Zeolite catalysts can include $SiO_2$, $Al_2O_3$, ZSM-5, ZSM-8, ZSM-11, ZSM-12, ZSM-35, ZSM-38, MFI, Pentasil, HZSM-5, T-4480, and the like, the catalysts may be combined as required to achieve specific product specifications.

The separators include gas-liquid, liquid-liquid, three-phase, horizontal, vertical, tubular, rotary, turbine, centrifugal, to include linear combinations, for example a gas-liquid separation of light gases from a mixture of liquids followed by a liquid-liquid separator to separate the organic phase from the aqueous phase. Additional separations may be added to improve the purity/separation of the light gas stream, organic stream, or aqueous stream.

Reformer catalysts include nickel impregnated aluminum oxide ($Ni/Al_2O_3$), nickel impregnated magnesium oxide (Ni/MgO), platinum impregnated aluminum oxide ($Pt/Al_2O_3$), platinum impregnated magnesium oxide (Pt/MgO), catalyst impregnated ceramic pellets, modified ceramics, metal foils, and combinations thereof.

Hydrotreater catalysts include nickel, aluminum, halfnium, platinum, palladium, ruthenium Raney nickel, palladium (II) acetate trimer, palladium (II) chloride, sodium tetrachloropalladate (II), tetrakis(triphenylphosphine) palladium (0), dihydrogen hexachloroplatinate (IV), platinum (II) chloride, platinum (IV) chloride, potassium tetrachloroplatinate (II), chloro(1,5-cyclooctadiene) rhodium (I) dimer, Chlorotris(triphenylphosphine) rhodium (I), rhodium (II) acetate dimer, Rhodium (III) chloride hydrate, ruthenium (III) chloride trihydrate, Iridium (III) chloride hydrate, osmium (VIII) tetroxide, rhenium carbonyl $Re_2(CO)_{10}$, organophosphines, nickel, copper impregnated zinc oxide (Cu/ZnO), copper impregnated (Cu/Cr), nickel aluminum oxide ($Ni/Al_2O_3$), palladium aluminum oxide ($Pd/Al_2O_3$), cobalt molybdenum (CoMo), nickel molybdenum (NiMo), and combinations thereof.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION OF EMBODIMENTS OF THE INVENTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Carbohydrates, such as starches and sugars may be converted in accordance with the present invention to form a hydrocarbon mixture useful for liquid fuels and chemicals. The term, "carbohydrate" is used generally to refer to a compound of carbon, hydrogen and oxygen having the general formula $C_x(H_2O)_y$, in which the ratio of hydrogen to oxygen is the same as in water. Carbohydrates include monosaccharides, polysaccharides, and mixtures of monosaccharides and/or polysaccharides. The term "monosaccharide" or "monosaccharides" are generally hydroxy aldehydes or hydroxy ketones which cannot be hydrolyzed into any simpler carbohydrate. Monosaccharides can be a triose with 3 carbon atoms, tetrose with 4 carbon atoms, pentose with 5 carbon atoms, hexose with 6 carbon atoms, or larger monosaccharides like Sedoheptulose with 7 carbon atoms or Neuraminic acid with 9 carbon atoms. Examples of monosaccharides include glyceraldehyde, erythrose, xylose, dextrose, glucose, fructose and galactose. The term "polysaccharide" or "polysaccharides" include those saccharides containing more than one monosaccharide unit. This term also includes disaccharides (such as sucrose, maltose, cellobiose, and lactose) and oligosaccharides.

Oxygenates are oxygen containing molecules such as alcohols including diols, triols, polyols, as well as ethers and other carbon compounds containing oxygen. Oxygenates include carbohydrates, sugars, pentoses, hexoses, monosaccharaides, dextrose, glucose, α-D-glucopyranose, β-D-glucopyranose, α-D-glucofuranose, β-D-glucofuranose, fructose, galactose, disaccharides, sucrose, lactose, maltose, fructose, cellobiose, melibiose, raffinose, glyceraldehyde, erythritol, xylitol, sorbitol, arabinitol, isosorbide, glycerol, glycerin, alcohol, methanol (MeOH), ethanol (EtOH), isopropyl alcohol (IPA), butanol (BuOH), n-butanol, t-butanol, ethers, methyl tert-butyl ether (MTBE), tertiary amyl methyl ether (TAME), tertiary hexyl methyl ether (THEME), ethyl tertiary butyl ether (ETBE), tertiary amyl ethyl ether (TAEE), diisopropyl ether (DIPE), hydroxymethyl-tetrahydrofuran or tetrahydro-2-furfuryl alcohol (THFA), methyl-tetrahydrofuran, 2-methyltetrahydrofuran, 3-methyltetrahydrofuran, diols, tetrahydrofuran, methanediol ($H_2C(OH)_2$), ethylene glycol, propane diols, 1,2-propanediol, 1,3-propanediol, butanediols, 1,2-butanediol, 1,3-butanediol, 1,4-butanediol, 2,3-butanediol, pentane diols, 1,2-pentanediol, 1,5-pentanediol, 1,8-octanediol, etohexadiol, p-menthane-3,8-diol, 2-methyl-2,4-pentanediol, aldehydes, propanal, butanal, 2,5-furan-diacrboxyaldehyde, carboxylates, acetic acid, oxopropanoic acid, acrylic acid, levulinic acid, succinic acid, 2,5-furan-dicarboxylic acid, aspartic acid, glucaric acid, glutamic acid, itaconic acid, acetylacrylic acid, 4-O-Me-glucuronic acid, gluconic acid, xylonic acid, esters, levuninate esters, lactones, valero lactone, α-methylene-γ-valerolactone, angelilactones, trisaccharides, oligosaccharides, polysaccharides, starch, among many other oxygenates not listed here including larger oxygenates. Many oxygenates may be contained in biomass extracts dependent upon the starting biomass and treatments used to extract components including sugars, carbohydrates, lignins, fatty acids, proteins, oils, and other components.

Oxygenate feedstock comprises a mixture of one or more carbohydrate derivatives including polysaccharides, monosaccharides, alcohols, diols, polyols, sugars and sugar alcohols from a variety of sources, as well as other byproducts of biological degradation that aren't removed as solids or are not completely removed by other processes. In some examples a single polyol, such as sorbitol or xylitol in aqueous solution is used as a carbon feedstock. In another embodiment, a mixed solution containing a natural byproducts such as the aqueous oxygenate containing solutions derived from acid hydrolysis of corn stover is used as a feedstock. Acid hydrolyzed corn stover may generate sorbitol, xylitol, furfural, hydroxymethyl furfural, levulinic acid or esters, polysaccharides, disaccharides, and monosaccharides as well as other degradation products. In another embodiment, insoluble starch (e.g., cornstarch) is used as the starting material. Starch, in its native form has two structural classes: amylose and amylopectin that is suspended in water and liquefied in the presence of acid and/or enzymes that convert the starch first, to a mixture of glucose, maltose, and higher saccharides then to a corn syrup mixture of glucose, maltose, and maltodextrins. Any number of biological and chemical pathways may be used with a variety of source materials to generate mixed oxygenate feedstocks for conversion to hydrocarbons. In yet another embodiment oxygenate feedstocks contain diols or alcohols, furfurals, and esters generated through various biological or chemical processes, may be co-fed with hydrogen donors to generate a variety of gasoline range fuel products. The zeolite catalyst may hydrogenate a number of uncharacterized oxygenates generated during various processes for solubilizing plant material including solubilization, pyrolysis, acid hydrolysis, fermentation, mechanical disruption and other processes.

Examples of carbohydrates useful as starting materials in accordance with the present invention include, but are not limited to, polysaccharides such as sucrose, maltose, lactose, cellobiose, melibiose, raffinose, starch (derived from a variety of cereal grains such as wheat and rice, tubers such as potato, tapioca, and arrowroot, or waxy starches such as waxy moil and maize) and starch decomposition products such as dextrin and corn syrup (also known as glucose syrup). Carbohydrates useful in the present invention may be dissolved in any aqueous reaction medium, including water. In addition reaction of carbohydrates with ion-exchange resins in accordance with U.S. Pat. No. 7,678,950, may be carried out in any suitable apparatus that enables intimate contact of the reactants and control of the operating conditions. The process may be carried out in batch, semi-continuous, or continuous operation. In one embodiment, a batch operation in a conventional autoclave is used.

Zeolite upgrading causes a variety of chemical changes in the hydrocarbons including removal of water (HOH), linear branching, elongation, and cyclization of the carbohydrates. Suitable zeolites include, but are not limited to, those disclosed in Kirk-Othmer Encyclopedia of Chemical Technology (1981), incorporated herein by reference. Generally, zeolites useful in the present invention have a constraint index (as defined in U.S. Pat. No. 4,097,367, which is incorporated herein by reference) in the range of from about 0.4 to about 12, and preferably in the range of from about 2 to about 9. In addition, the molar ration of $SiO_2$ to $Al_2O_3$ in the crystalline framework of the zeolite is at least about 5:1 and can range up to infinity. In one embodiment of the present invention, the molar ratio of $SiO_2$ to $Al_2O_3$ in the crystalline framework of the zeolite is in the range of from about 8:1 to about 200:1. In another embodiment of the present invention, SiO$_2$ to Al$_2$O$_3$ in the crystalline framework of the zeolite is in the range of from about 12:1 to about 100:1. Some zeolites useful in the present invention include but are not limited to ZSM-5, ZSM-8, ZSM-11, ZSM-12, ZSM-35, ZSM-38 and combinations thereof. Some of these zeolites are also known as "MFI" or "Pentasil" zeolites. In one example, the zeolite HZSM-5 purchased from UCI (United Catalysts, Inc., Louisville, Ky.) having a designate of T-4480 (obtained as a 1/16 inch extrudate) was used. Modified zeolites can also be used. Modified zeolites can include zeolites modified by metal cations, such as, for example, zinc, platinum, gallium, or nickel. Zeolites can also be modified by steam treatment, acid treatment, base treatment, as well as other treatments alone or in combination. In addition, zeolites of the present invention may be combined with a clay, promoter, and/or a binder. Zeolites useful in the present invention may also contain an inorganic binder (also referred to as matrix material) selected from the group consisting of alumina, silica, alumina-silica, aluminum phosphate, clays (such as bentonite), and combinations thereof. The type of zeolite used may cause the final product to vary dependent upon starting materials, reaction conditions, and length of reaction.

Reaction, or conversion, conditions for contacting a carbohydrate-containing material, whether or not such material has been hydrolyzed and/or hydrogenated, includes a reaction temperature in the range of from about 100° C. to about 1000° C. In another embodiment of the present invention, the temperature is in the range of from about 150° C. to about 800° C. In another embodiment of the present invention, the temperature is in the range of from about 200° C. to about 600° C. In another embodiment of the present invention, the temperature is in the range of from about 300° C. to about 500° C. The reaction temperature may be ~100° C., ~120° C., ~140° C., ~160° C., ~180° C., ~200° C., ~225° C., ~250° C., ~275° C., ~300° C., ~350° C., ~400° C., ~450° C., ~500° C., ~550° C., ~600° C., ~650° C., ~700° C., ~750° C., ~800° C., ~850° C., ~900° C., ~950° C., up to 1000° C. Dependent upon the rate and temperature controls in place the temperature may be controlled within ~1° C., ~2° C., ~5° C., ~10° C., ~20° C. or as a % of total temperature allowing variance of ~1%, ~2%, ~5%, ~10% up to ~20%. Although a variety of temperatures are specifically demonstrated above, the reaction temperature selected will be dependent upon the reactants, catalyst, products desired and reaction rates required. The reaction, or conversion, conditions for contacting a carbohydrate-containing material, whether or not such material has been hydrolyzed and/or hydrogenated, includes a pressure in the range of from about 1 psig to about 800 psig. In one embodiment of the present invention, the pressure is in the range of from about 3 to about 400 psig. In another embodiment of the present invention, the pressure is in the range of from about 5 to about 200 psig. The pressure during zeolite upgrading may be approximately 25, 50, 75, 100, 150, 200, 250, 300 250, 400, 450, 500, 600, 700, or 800 psig with approximately 10%-20% variations in the pressure or more.

The carbohydrate-containing feedstock may be contacted with a recycle stream containing hydrogenated hydrocarbons, hydrogen, and a combination of hydrogen and saturated hydrocarbons in order to form a variety of products containing a variety of fuel range hydrocarbons, light gases, and an aqueous solution. The saturated hydrocarbons may be introduced into the reaction chamber under pressure, which may vary with the nature of the reactants and the zeolite catalyst employed. The flow rate may vary depending on the specific reaction conditions and include flow rates of approximately 1, 2, 3, 4, 5, 7.5, 10, 12.5, 15, 17.5, 20, 30, 50, 75, 100 up to about 1150 ml/hr for 8 grams of catalyst. In one embodiment of the present invention, the flow rate is between approximately 0.1 ml/hr to 25 ml/hr per gram of catalyst, preferably between 0.5 and 7.0 ml/hr per gram of catalyst. Thus, using the embodiments described above, 10 g of catalyst could be run with a flow rate between about 1 ml/hr and about 250 ml/hr, preferably between about 5 ml/hr and 70 ml/hr. The viscosity of the fluid, temperature of the reaction, and porosity of the catalyst can all influence the flow rate, under certain circumstances, low viscosity, higher temperatures, and increased catalyst porosity, the flow rate can be increased to about 30 ml/hr, 40 ml/hr, 50 ml/hr or up to 60 ml/hr per gram of catalyst. To obtain larger volumes of product the reaction may be scaled from ml/hr to liters per hour or even barrels per day (bpd) to obtain commercial quantities of gasoline products. Dependent upon the reactants, desired products and hydrogen donors used, 1 to 100 kg of catalyst may be run with a flow rate between 1 l/hr to 100 l/hr to produce up to approximately 15,000 bpd. In one embodiment 1 kg of catalyst is run at 1 l/h for 24 hrs to produce 1 bpd of gasoline range fuel products. In another embodiment 100 kg of catalyst is run at 100 l/h to produce 1500 bpd. Under the right conditions, 100 kg of catalyst might be run at 1000 l/h to produce 15,000 bpd of gasoline range fuel products.

The time of reaction will depend upon the specific starting materials, concentrations, the specific catalyst used, pressure and temperature. Generally, the liquid hourly space velocity is in the range of from about 0.1 to about 10 hr$^{-1}$, which may be lower or higher depending on the desired conversion. The reaction is carried out in any suitable type of apparatus or reaction chamber which enable intimate contact of the reactants and control of the operating conditions. The process may be carried out in batch, semi-continuous, or continuous operation. In one embodiment of the present invention, a batch operation in a conventional autoclave is used. The reactants may be added to the reaction chamber in any suitable manner or in any suitable order. In one embodiment of the present invention, the oxygenate-containing solution is fed through the zeolite catalyst in a continuous reaction. Dependent upon reactor capacity, reformation rate, and rate of oxygenate feed, a commercial refinery may be configured to convert oxygenate feedstock to gasoline range fuel products at a rate of 1500 to 15000 bpd.

The process effluent, from the conversion zone, in accordance with the present invention, generally may contain gas and liquid fractions containing hydrocarbon products, which include, but are not limited to, a light gas fraction containing hydrogen, and methane, a C2-C4 fraction containing ethane, propane, ethylene, and propylene, an intermediate fraction including organic compounds having greater than 3 carbon atoms, a BTX aromatic hydrocarbons fraction (containing benzene, toluene, ortho-xylene, meta-xylene, and para-xylene) and a C9-C13+ fraction containing aromatic compounds having 9-13 or more carbon atoms per molecule.

A variety of separators are available with different purposes and results. Phase separators, hydrocyclones, reflux columns, and the like may be used to separate with different sensitivities an organic stream, a light gas phase, and an aqueous phase. The amount of each stream will depend upon the initial feedstock and desired products. Increasing the size of the feedstock carbohydrates or recycle stream hydrocarbons will subsequently increase the size of the hydrocarbons in the organic stream. In one embodiment, a three phase separator with stainless steel or carbon steel material can be used to separate the gas stream, liquid stream and aqueous stream. The three phase separator may be horizontal, vertical, tubular, rotary, turbine, centrifugal, or other type of separator. Separators may be combined in a linear fashion to achieve better separation of mixed solutions, including separators to remove one or more components at each separation. A variety of three phase separators are available from Monarch Separators, Houston, Tex.; Pacific Process Systems (PPS) Inc., Bakersfield, Calif.; Douglas Energy Company, Placentia, Calif.; Process Equipment & Service Company, Inc., Farmington, N. Mex.; Petrex, Inc., Harvey, La.; Permian Tank & Manufacturing, Odessa, Tex.; Zhangjiagang Chemical Machinery Co., Ltd., Suzhou, Jiangsu, China; GEA Westfalia Separator, Cujik, Netherlands and others, or through construction of a custom three phase separator system. In another embodiment, an elutriation column is used to separate the oil and water mixture into a light carbon fraction (C1-C5), an aqueous fraction containing water and water soluble components, and an organic stream containing gasoline range hydrocarbons from C5 to C13. Other separation techniques include using one or more pieces of equipment to separate hydrocarbons, aqueous liquids, and gases through any one of the three streams. In another embodiment, an organic stream is separated from the remaining solution, leaving the aqueous stream, light gas stream, and any contaminants or remaining particles to feed directly into the steam reformer. In another embodiment, some or all of the methane is separated from the light gas stream. The methane is used for steam reforming and the remainder of the light gases are sold as either natural gas or as individual gases including ethane, propane, butanes, pentanes, and other light gases. One of skill in the art may be able to separate out a variety of either mixed hydrocarbons or remove several hydrocarbons with increased purity for further processing or sale.

Organic components in the organic stream include a variety of hydrocarbons, both linear and cyclic, containing carbons from C4 to C12 including saturated and unsaturated hydrocarbons with C4, C5, C6, C7, C8, C9, C10, C11, and C12 carbons. The organic stream may be separated at this point into saturated high octane products and a feed stream for the hydrogenation reaction. Alternatively, a portion of the feedstream may be separated into a hydrogenation stream and a product stream. In one embodiment, the amount of organic stream fed into the hydrogenation reactor is assessed depending upon the quality of organic stream, hydrogenation of the organic stream, amount of hydrogen available and/or the amount of saturated hydrocarbons required to improve zeolite upgrading.

Light gases include methane, ethane, butane, isobutane, propane, pentane, and mixtures thereof. Light gases produced during hydrotreating may be processed into individual or mixed products such as methane, ethane, propane, butane, compressed natural gas (CNG), natural gas liquids (NGL), liquefied petroleum gas (LPG), liquefied natural gas (LNG), or transferred to reforming for hydrogen generation with biomass solids (FIG. 1). Light gases, typically removed and burned off as a low value product, are now used to add value with a steam reformer that generates both heat and hydrogen from the light gases and aqueous solution.

Aqueous solution contains water and water soluble components including salts, hydrophilic solutions, other compounds, as well as any solid debris that may be washed through to the reformer. Because the aqueous feedstock may contain a large portion of aqueous solution and is typically dissolved in aqueous solution, water produced must be recycled, repurposed, or purified prior to release. Feeding the aqueous solution to a steam reformer converts any contaminants and soluble matter into $CO_X$ and hydrogen with heat.

$$C_xH_{2x+2} + XH_2O \rightarrow XCO + (2X+1)H_2$$

$$(CH_2)_X + XH_2O \rightarrow XCO + 2XH_2$$

$$CO + H_2O \rightarrow CO_2 + H_2$$

In addition, the process effluent of the present invention may also contain by products of carbon monoxide and carbon dioxide ($CO_X$). According to one embodiment of the present invention, the hydrocarbon product contains less $CO_X$, less coke and fewer undesirable products are produced, when the reaction conditions are modified, for example, when the reaction conditions are at pressures generally in the range of from about 100 psig to about 200 psig. In addition, it has been discovered that higher reaction pressures, preferably at about 200 psig, result in the production of less $CO_X$ (preferably less than about 25 weight percent of the product), less coke, and upgrading of the hydrocarbon stream to a higher-octane gasoline.

By using the light gases and aqueous phase in a hydrogen reformer, large quantities of heat and hydrogen are generated. This solves multiple problems and allows complete utilization of the refined products from the zeolite upgrader. First, contaminated water present from the carbohydrate solution is converted mole per mole to hydrogen. Light gases, previously burned off as waste, are now converted to $CO_2$ and the energy used to generate heat for both reforming and the hydrotreating process. The net result is light gas hydrocarbons like methane ($CH_4$), ethane ($C_2H_6$), propane ($C_3H_8$) and any other gaseous hydrocarbons, as well as any solids, remaining polyols, or other gases from the light gas or aqueous feed are converted to gas and reformed at high temperatures. Each carbon burned in the reformer generates at least 4 hydrogens, produces enough heat for any remaining reactions, and ensures all of the products are used to upgrade the organic stream. All of the excess hydrogen generated is fed directly into the hydrotreater to convert any of a variety of carbon products to saturated hydrocarbons.

The aqueous stream and light gas stream are fed into the steam reformer. Any standard steam reforming catalyst may be used within the reformer. An exemplary steam reforming catalyst is nickel oxide on a low-silica refractory base. The steam reformer furnace may "stand alone", or operate in conjunction with a pre-reformer, post-reformer, or other schemes. In the furnace, the reforming of steam-hydrocarbon mixtures is accomplished in catalyst-filled tubes. In hydrogen plants, in-tube fluid pressures are typically 25÷30 kg/cm2 with outlet temperatures of between about 700 to 1250° C., including approximately 720° C., 740° C., 760° C., 780° C., 800° C., 820° C., 840° C., 860° C., 880° C., 900° C., 920° C., 940° C., 960° C., 980° C., 1000° C., 1020° C., 1040° C., 1060° C., 1080° C., 1100° C., 1120° C., 1140° C., 1160° C., 1180° C., 1200° C., 1220° C., 1240° C., 1260° C., or 1280° C. depending on the process requirements. Typically temperatures may vary by 10° C., 20° C., up to 50° C. or more. A variety of catalysts are available for a given feed and product requirement including nickel, nickel/alumina, limestone, dolomite and iron ore. In one embodiment, the temperature is in the range of 760 to 816° C. for complete reforming with nickel oxide catalyst on a low-silica refractory base with a steady stream of steam and light gases. Other reformer catalysts with a variety of different catalyst types including nickel impregnated aluminum oxide (Ni/Al$_2$O$_3$), nickel impregnated magnesium oxide (Ni/MgO), platinum impregnated aluminum oxide (Pt/Al$_2$O$_3$), platinum impregnated magnesium oxide (Pt/MgO), catalyst impregnated ceramic pellets, modified ceramics, metal foils, and the like, that can be used in the reforming reaction described above. Steam reacts with the light gases to yield carbon monoxide and hydrogen. Heat from the reaction is recycled for preheating in the hydrogenation section and/or to generate steam from the aqueous feed stream.

The organic stream from the separator is fed at high temperatures with increased hydrogen concentration into the hydrotreater. The hydrogenation reaction, as shown in but not limited to the reaction in U.S. Pat. No. 5,841,678, can be accomplished with numerous commercially available hydrotreating catalysts, with or without nitrogen in the presence of hydrogen. Temperatures may be optimized depending upon the size of the hydrocarbons, contaminants present, and activity of the hydrotreating catalyst. Some of the numerous hydrotreating catalysts include $MoS_2$ and NiMo. The reaction may be carried out at elevated temperatures and elevated pressures depending upon the reaction required. In one embodiment, the hydrotreating reaction is carried out at approximately 350° C. and about 3 MPa or approximately 450 psig. Typically reactions are maintained between 200° C. and 500° C. In one embodiment the temperature 250 to about 400° C., and reactor pressures from about 100 to about 2000 psig, preferably in the range of about 300 to about 1000 psig.

Hydrogenation reactions can also be accomplished by non-sulfided catalysts such as noble metals or nickel metal catalysts under hydrogen pressure. Typical noble metal catalysts are based on aluminum, hafnium, platinum, palladium, ruthenium or combinations thereof, with or without promoter supported metal oxides or carbon. Examples of hydrogenation catalysts include Raney nickel, palladium (II) acetate trimer, palladium (II) chloride, sodium tetrachloropalladate (II), tetrakis(triphenylphosphine) palladium (0), dihydrogen hexachloroplatinate (IV), platinum (II) chloride, platinum (IV) chloride, potassium tetrachloroplatinate (II), chloro(1,5-cyclooctadiene) rhodium (I) dimer, chlorotris(triphenylphosphine) rhodium (I), rhodium (II) acetate dimer, rhodium (III) chloride hydrate, ruthenium (III) chloride trihydrate, iridium (III) chloride hydrate, osmium (VIII) tetroxide, rhenium carbonyl $Re_2(CO)_{10}$, organophosphines, nickel, copper impregnated zinc oxide (Cu/ZnO), copper impregnated (Cu/Cr), nickel aluminum oxide (Ni/$Al_2O_3$), palladium aluminum oxide (Pd/$Al_2O_3$), cobalt molybdenum (CoMo), nickel molybdenum (NiMo), and the like. The hydrogenation metal may be supported on a metal support, metal oxides, ceramics or carbon with or without various promoters. Reaction temperatures could range from about 80° C. to about 400° C., including preferably between approximately 250° C. to 350° C. range. Reactions temperatures may be approximately 75° C., 100° C., 125° C., 150° C., 175° C., 200° C., 225° C., 250° C., 275° C., 300° C., 325° C., 350° C., 375° C., 400° C., or 425° C. with a range of 25° C. to 50° C. Hydrogen pressures range from about 200 psig to 2500 psig, typically including in the range of 600-1500 psig. Reaction pressures may be between approximately 200, 300, 400, 500, 600, 700, 800, 900, 1000, 1100, 1250, 1500, 1750, 2000, 2250, 2500 psig with a variation of 100 to 150 psig or approximately 10%-20% variation in psig.

The hydrogenation reaction hydrogenates any unsaturated bonds in the hydrocarbon to create fully saturated hydrocarbons. A high percentage of aromatics such as toluene and xylene in the organic stream contribute to high octane number. The presence of a hydrocarbon recycle stream contributes to upgrading of the incoming hydrocarbon feedstream, improving removal of hydroxyls from the carbohydrates to form more hydrocarbons and less $CO_X$ thus reducing coking and fouling of the zeolite catalyst. The saturated hydrocarbons from the hydrotreater donate hydrogens to the zeolite upgrading and are incorporated in the cyclization, branching, and elongation of incoming polyols and carbohydrates to polyols.

The following examples of certain embodiments of the invention are given. Each example is provided by way of explanation of the invention, one of many embodiments of the invention, and the following examples should not be read to limit, or define, the scope of the invention.

EXAMPLE 1

Sorbitol Zeolite Reforming

In one example, as shown in Table I, toluene is a major product from zeolite reforming and methyl cyclohexane is a product after hydrogenation of toluene. Methyl cyclohexane was co-fed with sorbitol over a zeolite upgrading catalyst. The reaction was carried out at 450° C., 200 psig, with 8 g ZSM-5. The feed rates of sorbitol (70% sorbitol with 30% water) and methyl cyclohexane were 10 ml/hr and 12 ml/hr, respectively. The reaction products included greater than 50% C5+ hydrocarbons with a high percentage of those hydrocarbons being aromatic (58%). The high aromatic content and large number of C5+ hydrocarbons led to a gasoline product with an approximate octane rating of 99. This is an ideal octane rating for high performance gasoline fuels and exceeds the required octane rating for "premium" gasoline in the United States and "superplus" gasoline in Europe. This demonstrates that mixing a hydrogenated product from the product stream, methylcyclohexane, with the sorbitol feedstock produces a high octane gasoline quality fuel from a biological source material, sorbitol.

TABLE 1

Sorbitol and Xylitol processing to gasoline hydrocarbons.

| Run ID | A |
|---|---|
| Oxygnate Molecules | Sorbitol |
| Hydrogen donor | Methylcyclohexane |
| T(° C.) | 450 |
| Catalyst Description | ZSM-5 |
| Product selectivity (wt %) | |
| $C_1$-$C_4$ Paraffins | 25.77 g (25%) |
| $C_2$-$C_4$ olefins | 1.68 g (2%) |
| $C_5$+ | 55.30 g (53%) |
| CO + $CO_2$ | 11.26 g (11%) |
| Coke | 5.99 g (6%) |
| Coke on Cat. | 3.43 g (3%) |
| Aromatics content in $C_5$+ fraction (wt %) | 58.2 |
| Octane number of $C_5$+ fraction | 99.3 |

EXAMPLE 2

Xylitol Zeolite Reforming

The process in example 1 was repeated with xylitol (50 wt % aqueous solution) instead of sorbitol. The same process conditions were used, the reaction was carried out at 450° C., 200 psig, with 8 g ZSM-5. Xylitol (50% xylitol with 50% water) and methyl cyclohexane were fed at rates of 10 ml/hr and 12 ml/hr, respectively. Xylitol was converted into over 60% gasoline range hydrocarbons with and octane rating of 107.6. This high level of octane rating makes the fuel ideal for mixing to bring up the octane of fuels with lower octane ratings. Additionally, the high levels of conversion with sorbitol and xylitol indicate that polyols in general can be converted to gasoline quality fuels with high octane ratings of nearly 100 or greater than 100 from biological feedstocks comprising polyols and water.

TABLE 2

Xylitol processing to gasoline hydrocarbons.

| Run ID | B |
|---|---|
| Oxygnate Molecules | Xylitol |
| Hydrogen donor | Methylcyclohexane |
| T(° C.) | 450 |
| Catalyst Description | ZSM-5 |
| Product selectivity (wt %) | |
| $C_1$-$C_4$ Paraffins | 27.05 (27%) |
| $C_2$-$C_4$ olefins | 2.26 (2%) |
| $C_5$+ | 60.95 (60%) |
| $CO + CO_2$ | 8.29 (8%) |
| Coke | 1.45 (1%) |
| Coke on Cat. | 1.21 (1%) |
| Aromatics content in $C_5$+ fraction (wt %) | 80.96 |
| Octane number of $C_5$+ fraction | 107.6 |

The use of hydrogenated hydrocarbon feedstreams with a biological feedstream like mixed polyol solutions, polyol solutions with hydrocarbons, allows the conversion of these feed streams into higher octane gasoline products with about or greater than 100 octane. The hydrogenated feedstream can be generated by separating the products of zeolite upgrading into an organic stream, a $CO_X$ stream and a light gas stream (C1-C4). The light gas stream can be used to fuel a steam reforming reactor to generate hydrogen and $CO_2$. The heat from the steam reformer and hydrogen are fed into the hydrogenation reactor to generate gasoline products and a hydrogenated recycle stream. The hydrogenated recycle stream contains high concentrations of completely hydrogenated hydrocarbons like methylcyclohexane, hexane, ethylcyclohexane, cyclohexane, pentane, isopentane, butane, isobutene, and the like.

EXAMPLE 3

1,5-Pentane Diol Zeolite Upgrading without Hydrogen Donor

An oxygenate mixture of 1,5-pentane diol (58 wt %), hydroxymethyl-tetrahydrofuran (THFA) (31 wt %) and methyl-tetrahydrofuran (11 wt %) was fed over a zeolite upgrading catalyst. The reaction was carried out at 450° C., 250 psig, using 12 g of zinc-modified ZSM-5 catalyst. The feed rate of the liquid oxygenate mixture was 9.94 ml/hr. Nitrogen gas at 200 sccm was co-fed to the reaction. The reaction products are shown in the Table 3 below.

TABLE 3

1,5-Pentane Diol processing without hydrogen donor.

| Run ID | C |
|---|---|
| Oxygenate Molecules | 1,5-pentane diol (58 wt %)<br>THFA (31 wt %)<br>methyl-tetrahydrofuran (11 wt %) |
| Hydrogen donor | None |
| T(° C.) | 450 |
| Catalyst Descriptor | Zn-ZSM-5 |
| Oxygenate feed rate, g/hr | 9.94 |
| Production rate, g/hr | |
| C1-C4 Paraffins | 1.63 |
| C2-C4 Olefins | 0.056 |
| C5+ | 4.14 |
| CO + CO2 | 0.68 |
| Coke | 0.25 |
| Oxygenate conversion, g/hr | 9.93 |
| Coke selectivity, wt % | 2.6 |
| Aromatics content in C5+ fraction (wt %) | 97% |

EXAMPLE 4

1,5-Pentane Diol Zeolite Upgrading with Hydrogen Donor

A mixture of propane (8 vol %) and propylene (3 vol %) in nitrogen was co-fed with an oxygenate mixture of 1,5-pentane diol (58 wt %), hydroxymethyl-tetrahydrofuran (THFA) (31 wt %) and methyl-tetrahydrofuran (11 wt %) over a zeolite upgrading catalyst. Propane and propylene are major light gas products formed by oxygenate conversion over zeolites. The reaction was carried out at 450° C., 250 psig, using 12 g of zinc-modified ZSM-5 catalyst. The feed rates of propane/propylene/nitrogen gas and the liquid oxygenate mixture were 200 sccm and 9.94 ml/hr, respectively. The reaction products showed an increase in liquid (C5+) hydrocarbon production and a decrease in coke selectivity as shown in the Table 4 below.

TABLE 4

1,5-Pentane Diol processing without hydrogen donor.

| Run ID | D |
|---|---|
| Oxygenate Molecules | 1,5-pentane diol (58 wt %)<br>THFA (31 wt %)<br>methyl-tetrahydrofuran (11 wt %) |
| Hydrogen donor | Propane, propylene |
| T(° C.) | 450 |
| Catalyst Desription | Zn-ZSM-5 |
| Feed rate, g/hr | |
| Oxygenates | 9.94 |
| Propane | 1.89 |
| Propylene | 0.68 |
| Production rate, g/hr | |
| C1-C4 Paraffins | 2.83 |
| C2-C4 Olefins | 0.10 |
| C5+ | 4.81 |
| CO + CO2 | 0.65 |
| Coke | 0.20 |
| Conversions, g/hr | |
| Oxygenates | 9.91 |
| Propane | 0.93 |
| Propylene | 0.65 |
| Coke selectivity, wt % | 1.8 |
| Aromatics content in C5+ fraction (wt %) | 95% |

Examples 3 and 4 demonstrate that hydrogen donors dramatically reduce coke formation. Coke selectivity is reduced from 2.6 to 1.8 (approximately a 33% reduction). In terms of reactor life, this dramatic reduction in coke formation will allow a commercial reactor with a hydrogen donor system to continue product for months longer than a commercial reactor without a hydrogen donor system. Additionally, by using light products to feed a hydrogen reformer, liquid fuel products were increased, heat is generated that may be used elsewhere in the production, and a recycled hydrogen source is used thus no outside costs or suppliers need to be brought in to increase product hydrogen content. This dramatically improves the quality of the product, decreases the cost of refinery operations, and generates large quantities of renewable gasoline fuels.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents. In closing, it should be noted that each and every claim below is hereby incorporated into this detailed description or specification as an additional embodiments of the present invention.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. U.S. Pat. No. 4,097,367, "Conversion of olefinic naphtha," Haag & Huang, Mobil Oil Corp. (1978).
2. U.S. Pat. No. 4,503,278, U.S. Pat. No. 4,549,031, "Process for converting carbohydrates to hydrocarbons," Chen & Koenig, Mobil Oil Corp. (1985).
3. U.S. Pat. No. 4,690,903, U.S. Pat. No. 4,420,561, U.S. Pat. No. 4,515,892, "Process for preparing organic fuels and chemicals from biomass," Chen & Miale, Mobil Oil Corp. (1987).
4. U.S. Pat. No. 5,336,819, WO8805807, "Process for preparing organic fuels and chemicals from biomass," McAuliffe & Benn, Man Oil Ltd (1994).
5. U.S. Pat. No. 5,841,678, "Modeling and simulation of a reaction for hydrotreating hydrocarbon oil," Hasenberg & Campagnolo, ConocoPhillips Co., (1998).
6. U.S. Pat. No. 6,090,990, "Method of making an improved catalyst containing zeolite treated with boron trichloride, the product from such method, and the use thereof in the conversion of hydrocarbons,"
7. U.S. Pat. No. 7,550,634, US2007175795, WO2008054442, "Process for converting triglycerides to hydrocarbons," Yao, et al., ConocoPhillips Co., (2009).
8. U.S. Pat. No. 7,678,950, US2007142633, US20100099933, WO2007075370 "Process for converting carbohydrates to hydrocarbons," Yao, et al., ConocoPhillips Co., (2005).
9. US 2011-0046423, WO 2011/025632, "Hydrotreating Hydrocarbons," Sughrue, et al., ConocoPhillips Co. (2009).
10. U.S. Ser. No. 12/912,164, PCT/US10/54104, "Conversion of Carbohydrates to Hydrocarbons," Yao, et al., ConocoPhillips Co., (2009).
11. EP0366138, "Process for manufacturing fuel from lignocellulose material," Jelks & Strouth, (1990.)
12. Kirk-Othmer Encyclopedia of Chemical Technology, 3rd ed., 15:638-69 (John Wiley & Sons, New York, 1981)

The invention claimed is:

1. An upgrading system to convert polyols into hydrocarbons comprising:
    a) a feed stream comprising a oxygenate feedstock,
    b) a catalytic upgrader comprising a zeolite catalyst and configured to upgrade the feed stream to mixed hydrocarbons,
    c) a separator operatively connected to the catalytic upgrader and configured to receive and separate the mixed hydrocarbons to generate a light gas stream, an aqueous stream and an organic stream,
    d) a reformer configured to receive the light gas stream c) and the aqueous stream c) and to convert the light gas stream into a hydrogen stream,
    e) a hydrotreater operatively connected to the separator and reformer and configured to convert part of the organic stream (c) and hydrogen stream (d) into a saturated hydrocarbon stream, and
    f) a recycle system operatively connected to the catalytic reactor and the hydrotreater and configured to recycle a portion of the hydrotreater product comprising saturated hydrocarbons to the catalytic upgrader (a) as a hydrogen donor.

2. The system of claim 1, wherein said oxygenate feedstock comprises oxygenates derived from biological materials.

3. The system of claim 1, wherein said zeolite catalyst (b) is selected from the group consisting of ZSM-12, ZSM-35, ZSM-38, Pentasil zeolite, and combinations thereof.

4. The system of claim 3, wherein said pentasil zeolite is selected from the group consisting of ZSM-5, ZSM-8, ZSM-11, HZSM-5, T-4480, and combinations thereof.

5. The system of claim 1, wherein said separator (c) is selected from the group consisting of a gas-liquid separator, liquid-liquid separator, three-phase separator, horizontal separator, vertical separator, tubular separator, rotary separator, turbine separator, centrifugal separator and combinations thereof.

6. The system of claim 1, wherein said reformer (d) comprises a catalyst selected from the group consisting of nickel impregnated aluminum oxide ($Ni/Al_2O_3$), nickel impregnated magnesium oxide (Ni/MgO), platinum impregnated aluminum oxide ($Pt/Al_2O_3$), platinum impregnated magnesium oxide (Pt/MgO), catalyst impregnated ceramic pellets, modified ceramics, metal foils, and combinations thereof.

7. The system of claim 1, wherein said hydrotreater comprises a catalyst selected from the group consisting of nickel, aluminum, halthium, platinum, palladium, ruthenium Raney nickel, palladium (II) acetate trimer, palladium (II) chloride, sodium tetrachloropalladate (II), tetrakis(triphenylphosphine) palladium (0), dihydrogen hexachloroplatinate (IV), platinum (II) chloride, platinum (IV) chloride, potassium tetrachloroplatinate (II), chloro(1,5-cyclooctadiene) rhodium (I) dimer, Chlorotris(triphenylphosphine) rhodium (I), rhodium (II) acetate dimer, Rhodium (III) chloride hydrate, ruthenium (III) chloride trihydrate, Iridium (III) chloride hydrate,osmium (VIII) tetroxide, rhenium carbonyl $Re_2(CO)_{10}$, organophosphines, nickel, copper impregnated zinc oxide (Cu/ZnO), copper impregnated (Cu/Cr), nickel aluminum oxide ($Ni/Al_2O_3$), palladium aluminum oxide (Pd/

Al₂O₃), cobalt molybdenum (CoMo), nickel molybdenum (NiMo), and combinations thereof.

8. The system of claim 1, wherein said hydrotreater product comprises alkanes, alkenes, and combinations thereof.

9. The system of claim 1, wherein said oxygenate feedstock comprises carbohydrates derived from biological materials.

10. The system of claim 1, wherein said oxygenate feedstock comprises at least one of sugars, alcohols, ethers, furans, carboxylic acids and esters derived from biological materials.

11. The system of claim 1, wherein said oxygenate feedstock comprises at least one sugar selected from pentoses, hexoses, dextrose, glucose, α-D-glucopyranose, β-D-glucopyranose, α-D-glucofuranose, β-D-glucofuranose, fructose, galactose, sucrose, lactose, maltose, fructose, cellobiose, melibiose, raffinose and their derivatives.

12. The system of claim 1, wherein said oxygenate feedstock comprises at least one alcohol selected from methanol (MeOH), ethanol (EtOH), isopropyl alcohol (IPA), butanol (BuOH), n-butanol and t-butanol.

13. The system of claim 1, wherein said oxygenate feedstock comprises at least one ether selected from methyl tert-butyl ether (MTBE), tertiary amyl methyl ether (TAME), tertiary hexyl methyl ether (THEME), ethyl tertiary butyl ether (ETBE), tertiary amyl ethyl ether (TAEE), and diisopropyl ether (DIPE).

14. The system of claim 1, wherein said oxygenate feedstock comprises at least one diol selected from methanediol (H₂C(OH)₂), ethylene glycol, 1,2-propanediol, 1,3-propanediol, 1,2-butanediol, 1,3-butanediol, 1,4-butanediol, 2,3-butanediol, 1,2-pentanediol, 1,5-pentanediol, 1,8-octanediol, etohexadiol, p-menthane-3,8-diol and 2-methyl-2,4-pentanediol.

15. The system of claim 1, wherein said oxygenate feedstock comprises at least one aldehyde selected from propanal, butanal and 2,5-furan-diacrboxyaldehyde.

16. The system of claim 1, wherein said oxygenate feedstock comprises at least one carboxylic acid selected from acetic acid, oxo-propanoic acid, acrylic acid, levulinic acid, succinic acid, 2,5-furan-dicarboxylic acid, aspartic acid, glucaric acid, glutamic acid, itaconic acid, acetylacrylic acid, 4-O-Me-glucuronic acid, gluconic acid and xylonic acid.

17. The system of claim 1, wherein said oxygenate feedstock comprises at least one ester selected from levulinate esters, valero lactone, α-methylene-γ-valerolactone and angelilactone.

18. A method for upgrading biomass oxygenates into hydrocarbons comprising:
a) upgrading an oxygenate feedstock with a catalytic upgrader comprising a zeolite catalyst and one or more hydrogen donors,
b) separating a light gas stream, an aqueous stream and an organic stream,
c) reforming the light gas stream into a hydrogen stream,
d) hydrotreating the organic stream (b) with a hydrotreating catalyst and a hydrogen stream (c), and
e) isolating a saturated hydrocarbon stream, and a recycle system, wherein a portion of the hydrotreater product comprising saturated hydrocarbons is recycled to the catalytic upgrader (a) as a hydrogen donor molecule.

19. The system of claim 18, wherein said oxygenate feedstock comprises oxygenates derived from biological materials.

20. The method of claim 18, wherein said zeolite catalyst (a) is selected from the group consisting of ZSM-12, ZSM-35, ZSM-38, Pentasil zeolite, and combinations thereof.

21. The method of claim 20, wherein said pentasil zeolite catalyst is selected from the group consisting of ZSM-5, ZSM-8, ZSM-11, HZSM-5, T-4480, and combinations thereof.

22. The method of claim 18, wherein said separator (c) is selected from the group consisting of a gas-liquid separator, liquid-liquid separator, three-phase separator, horizontal separator, vertical separator, tubular separator, rotary separator, turbine separator, centrifugal separator and combinations thereof.

23. The method of claim 18, wherein said reformer (d) comprises a catalyst selected from the group consisting of nickel impregnated aluminum oxide (Ni/Al₂O₃), nickel impregnated magnesium oxide (Ni/MgO), platinum impregnated aluminum oxide (Pt/Al₂O₃), platinum impregnated magnesium oxide (Pt/MgO), catalyst impregnated ceramic pellets, modified ceramics, metal foils, and combinations thereof.

24. The method of claim 18, wherein said hydrotreater comprises a catalyst selected from the group consisting of nickel, aluminum, halfnium, platinum, palladium, ruthenium Raney nickel, palladium (II) acetate trimer, palladium (II) chloride, sodium tetrachloropalladate (II), tetrakis(triphenylphosphine) palladium (0), dihydrogen hexachloroplatinate (IV), platinum (II) chloride, platinum (IV) chloride, potassium tetrachloroplatinate (II), chloro(1,5-cyclooctadiene) rhodium (I) dimer, Chlorotris(triphenylphosphine) rhodium (I), rhodium (II) acetate dimer, Rhodium (III) chloride hydrate, ruthenium (III) chloride trihydrate, Iridium (III) chloride hydrate, osmium (VIII) tetroxide, rhenium carbonyl Re₂(CO)₁₀, organophosphines, nickel, copper impregnated zinc oxide (Cu/ZnO), copper impregnated (Cu/Cr), nickel aluminum oxide (Ni/Al₂O₃), palladium aluminum oxide (Pd/Al₂O₃), cobalt molybdenum (CoMo), nickel molybdenum (NiMo), and combinations thereof.

25. The method of claim 18, wherein said hydrotreater product comprises alkanes, alkenes, and combinations thereof.

26. The system of claim 18, wherein said oxygenate feedstock comprises carbohydrates derived from biological materials.

27. The system of claim 18, wherein said oxygenate feedstock comprises at least one of sugars, alcohols, ethers, furans, carboxylic acids and esters derived from biological materials.

28. The system of claim 18, wherein said oxygenate feedstock comprises at least one sugar selected from pentoses, hexoses, dextrose, glucose, α-D-glucopyranose, β-D-glucopyranose, α-D-glucofuranose, β-D-glucofuranose, fructose, galactose, sucrose, lactose, maltose, fructose, cellobiose, melibiose, raffinose and their derivatives.

29. The system of claim 18, wherein said oxygenate feedstock comprises at least one alcohol selected from methanol (MeOH), ethanol (EtOH), isopropyl alcohol (IPA), butanol (BuOH), n-butanol and t-butanol.

30. The system of claim 18, wherein said oxygenate feedstock comprises at least one ether selected from methyl tert-butyl ether (MTBE), tertiary amyl methyl ether (TAME), tertiary hexyl methyl ether (THEME), ethyl tertiary butyl ether (ETBE), tertiary amyl ethyl ether (TAEE), and diisopropyl ether (DIPE).

31. The system of claim 18, wherein said oxygenate feedstock comprises at least one diol selected from methanediol (H₂C(OH)₂), ethylene glycol, 1,2-propanediol, 1,3-propanediol, 1,2-butanediol, 1,3-butanediol, 1,4-butanediol, 2,3- butanediol, 1,2-pentanediol, 1,5-pentanediol, 1,8-octanediol, etohexadiol, p-menthane-3,8-diol and 2-methyl-2,4-pentanediol.

32. The system of claim 18, wherein said oxygenate feedstock comprises at least one aldehyde selected from propanal, butanal and 2,5-furan-diacrboxyaldehyde.

33. The system of claim 18, wherein said oxygenate feedstock comprises at least one carboxylic acid selected from acetic acid, oxo-propanoic acid, acrylic acid, levulinic acid, succinic acid, 2,5-furan-dicarboxylic acid, aspartic acid, glucaric acid, glutamic acid, itaconic acid, acetylacrylic acid, 4-O-Me-glucuronic acid, gluconic acid and xylonic acid.

34. The system of claim 18, wherein said oxygenate feedstock comprises at least one ester selected from levulinate esters, valero lactone, α-methylene-γ-valerolactone and angelilactone.

* * * * *